US 10,852,405 B2

(12) United States Patent
Hoare et al.

(10) Patent No.: US 10,852,405 B2
(45) Date of Patent: Dec. 1, 2020

(54) ULTRASONIC SENSOR SYSTEM IN A VEHICLE FOR TERRAIN IDENTIFICATION (71) Applicant: JAGUAR LAND ROVER LIMITED, Coventry (GB)

(72) Inventors: Edward Hoare, Malvern (GB); Thuy-Yung Tran, Rugby (GB); Marina Gashinova, Birmingham (GB); Aleksandr Bystrov, Birmingham (GB); Mikhail Cherniakov, Birmingham (GB)

(73) Assignee: Jaguar Land Rover Limited, Coventry (GB)

(*) Notice: Subject to any disclaimer, the term of this patent is extended or adjusted under 35 U.S.C. 154(b) by 256 days.

(21) Appl. No.: 15/745,669

(22) PCT Filed: Jul. 14, 2016

(86) PCT No.: PCT/EP2016/066771
§ 371 (c)(1),
(2) Date: Jan. 17, 2018

(87) PCT Pub. No.: WO2017/012982
PCT Pub. Date: Jan. 26, 2017

(65) Prior Publication Data
US 2018/0210074 A1 Jul. 26, 2018

(30) Foreign Application Priority Data

Jul. 17, 2015 (GB) .................................. 1512586.7

(51) Int. Cl.
G01S 7/539 (2006.01)
G01S 7/527 (2006.01)
(Continued)

(52) U.S. Cl.
CPC .............. *G01S 7/539* (2013.01); *G01S 7/527* (2013.01); *G01S 7/5273* (2013.01); *G01S 15/86* (2020.01);
(Continued)

(58) Field of Classification Search
CPC .......... G01S 7/539; G01S 15/86; G01S 15/88; G01S 7/527; G01S 7/5273; G01S 15/931;
(Continued)

(56) References Cited

U.S. PATENT DOCUMENTS 5,450,322 A 9/1995 Tanaka et al.
5,586,028 A 12/1996 Sekine et al.
(Continued)

FOREIGN PATENT DOCUMENTS

DE 4119494 A1 1/1992
DE 102011003334 A1 8/2012
(Continued)

OTHER PUBLICATIONS

Combined Search and Examination Report for application No. GB1512586.7, dated Feb. 26, 2016, 7 pages.
(Continued)

*Primary Examiner* — Daniel Pihulic
(74) *Attorney, Agent, or Firm* — Reising Ethington P.C.

(57) ABSTRACT

The present invention provides a system for use in a vehicle for determining an indication of the type of terrain in the vicinity of the vehicle. The system comprises a processor arranged to receive acoustic sensor output data from at least one vehicle-mounted acoustic sensor, the or each acoustic sensor being arranged to receive a reflected signal from the terrain in the vicinity of the vehicle, the processor also being arranged to calculate at least one acoustic parameter in dependence on the acoustic sensor output data. The system also comprises a data memory arranged to store pre-deter-
(Continued)

mined data relating the at least one acoustic parameter to a particular terrain type. The processor is arranged to compare the at least one acoustic parameter with the pre-determined data to determine an indication of the particular terrain type based on the acoustic sensor output data only.

20 Claims, 5 Drawing Sheets (51) Int. Cl.
G01S 15/02 (2006.01)
G01S 15/93 (2020.01)
G01S 15/931 (2020.01)
G01S 15/88 (2006.01)
G01S 15/86 (2020.01)
G01S 15/00 (2020.01)

(52) U.S. Cl.
CPC ............ *G01S 15/88* (2013.01); *G01S 15/931* (2013.01); *G01S 15/003* (2013.01); *G01S 2015/937* (2013.01); *G01S 2015/938* (2013.01)

(58) Field of Classification Search
CPC ............. G01S 15/003; G01S 2015/937; G01S 2015/938; G01S 15/02; B60W 2552/05; B60W 40/06; G01B 17/08
See application file for complete search history.

(56) References Cited

U.S. PATENT DOCUMENTS

| 2004/0138831 A1 | 7/2004 | Watanabe et al. |
| 2004/0204812 A1 | 10/2004 | Tran |
| 2011/0077813 A1 | 3/2011 | Hadsell et al. |
| 2014/0257621 A1 | 9/2014 | Zych |
| 2017/0166214 A1* | 6/2017 | Hoare .................... G01S 7/539 |
| 2018/0210074 A1* | 7/2018 | Hoare .................... G01S 7/539 |
| 2019/0193735 A1* | 6/2019 | Cherniakov ........ B60W 40/068 |

FOREIGN PATENT DOCUMENTS

| DE | 102011085287 A1 | 5/2013 |
| GB | 2261510 A | 5/1993 |
| GB | 2492655 A | 1/2013 |
| GB | 2523091 A | 8/2015 |
| GB | 2523092 A | 8/2015 |
| KR | 1020130062034 A | 6/2013 |

OTHER PUBLICATIONS

International Search Report for International application No. PCT/EP2016/066771, dated Oct. 17, 2016, 6 pages.
Written Opinion for International application No. PCT/EP2016/066771, dated Oct. 17, 2016, 9 pages.

* cited by examiner

ULTRASONIC SENSOR SYSTEM IN A VEHICLE FOR TERRAIN IDENTIFICATION

TECHNICAL FIELD

The invention relates to a system for use in a vehicle and particularly, but not exclusively to a system that enables the vehicle to determine an indication of the type of terrain in the vicinity of the vehicle. Aspects of the invention relate to vehicle systems and methods, and to a vehicle.

BACKGROUND

Many modern vehicles are fitted with systems (anti-lock braking, adjustable ride height etc.) designed to improve the riding experience of the users. The riding experience could be a measure of, for example, vehicle composure or comfort. The setup of the systems of a vehicle such that the riding experience is optimised may be dependent on the type of terrain over which the vehicle travels. Current systems have defined system configurations for a plurality of different terrain types. In a vehicle terrain response system (VTRS), such as Terrain Response®, the user may determine the terrain type over which the vehicle is travelling, or determine the terrain type ahead of the vehicle, for example visually, and manually input this information into the VTRS which then adjusts the configuration of the systems appropriately. Alternatively, the vehicle may be fitted with sensors designed to measure certain characteristics of vehicle sub-systems (such as wheel acceleration, wheel slip, steering force estimator etc.) that are indicative of the terrain type over which the vehicle is travelling. Based on these measurements, the VTRS may determine the terrain type that most likely fits with these characteristics, and adjust the configuration of the systems appropriately, for example as described in published UK patent document GB 2492655. However, the determination of a terrain type by examining vehicle parameters using on-board systems is reactive to the terrain over which the vehicle is currently travelling and as such does not allow, without user-input, the vehicle to prepare and/or adopt an appropriate configuration in advance for the terrain over which it is about to travel.

One object of the present invention is to provide a system for use in a vehicle that is able to determine certain characteristics relating to the terrain ahead of a vehicle addressing the disadvantages of the systems in the prior art.

SUMMARY OF THE INVENTION

Aspects and embodiments of the invention provide a system, a method and a vehicle as claimed in the appended claims.

According to an aspect of the present invention there is provided a system for use in a vehicle for determining an indication of the type of terrain in the vicinity of the vehicle. The system comprises a processor arranged to receive acoustic sensor output data from at least one vehicle-mounted acoustic sensor, the or each acoustic sensor being arranged to receive a reflected signal from the terrain in the vicinity of the vehicle, and the processor is also arranged to calculate at least one acoustic parameter in dependence on the acoustic sensor output data. The system further comprises a data memory arranged to store pre-determined data relating the at least one acoustic parameter to a particular terrain type. In addition the processor is arranged to compare the at least one acoustic parameter with the pre-determined data to determine an indication of the particular terrain type based on the acoustic sensor output data only.

As used herein it will be understood that the phrase "the processor is arranged" means that the processor is provided with a series of electronically executable instructions that are stored in an associated memory means which are executable on the processor so as to carry out the associated stated function.

References to a sensor being "on the vehicle" may include both permanent vehicle mounted sensors or a portable device carried on the vehicle temporarily.

The present invention is advantageous in that it is relatively inexpensive and simple to implement. In particular, one or more existing acoustic sensors mounted on the vehicle may be used to provide sensor output data to the system, meaning no extra (and expensive) hardware is needed on the vehicle.

The use of one or more acoustic sensors is particularly advantageous in providing the system with sensor output data to make an accurate determination of potentially challenging terrain in the immediate vicinity of the vehicle or with reasonably close proximity to the vehicle.

The present invention is particularly useful for use in a vehicle that is travelling at low speed and/or in off-road conditions. The type of terrain over which a vehicle travels in off-road conditions may vary more than in an on-road setting. In addition, the particular types of terrain likely to be encountered during off-road driving may be more challenging than on-road. This may mean that a particular vehicle setup is needed so as to best negotiate a particular terrain type, making it even more important that an indication of the terrain type in the vicinity of the vehicle is determined. A vehicle may travel at low speed (for example, below about 50 kph) in most off-road settings; however, there are also many on-road driving situations in which a vehicle travels at low speed. The one or more acoustic sensors of the present invention are particularly useful at receiving signals reflected from terrain at relatively close range (for example, about 0.5 m to about 6 m from the vehicle) and so, for example, the setup of vehicles travelling at low speed may be automatically or manually adjusted in order to negotiate terrain in the vicinity of the vehicle.

The processor may be an electronic processor having an electrical input for receiving the acoustic sensor output data, and the data memory may be an electronic memory device electrically coupled to the electronic processor and having instructions stored therein. In such an embodiment, the processor is configured to access the memory device and execute the instructions stored therein such that it is operable to calculate the at least one acoustic parameter, and to compare the at least one acoustic parameter with the predetermined data to determine an indication of the particular terrain type based on the acoustic sensor output data only.

For purposes of this disclosure, it is to be understood that the controller(s) described herein can each comprise a control unit or computational device having one or more electronic processors. A vehicle and/or a system thereof may comprise a single control unit or electronic controller or alternatively different functions of the controller(s) may be embodied in, or hosted in, different control units or controllers. As used herein, the term "vehicle control system" will be understood to include both a single control unit or controller and a plurality of control units or controllers collectively operating to provide the required control functionality. A set of instructions could be provided which, when executed, cause said controller(s) or control unit(s) to implement the control techniques described herein (including the method(s) described below). The set of instructions may be embedded in one or more electronic processors, or alternatively, the set of instructions could be provided as software to be executed by one or more electronic processor (s). For example, a first controller may be implemented in software run on one or more electronic processors, and one or more other controllers may also be implemented in software run on one or more electronic processors, optionally the same one or more processors as the first controller. It will be appreciated, however, that other arrangements are also useful, and therefore, the present invention is not intended to be limited to any particular arrangement. In any event, the set of instructions described above may be embedded in a computer-readable storage medium (e.g., a non-transitory storage medium) that may comprise any mechanism for storing information in a form readable by a machine or electronic processors/computational device, including, without limitation: a magnetic storage medium (e.g., floppy diskette); optical storage medium (e.g., CD-ROM); magneto optical storage medium; read only memory (ROM); random access memory (RAM); erasable programmable memory (e.g., EPROM ad EEPROM); flash memory; or electrical or other types of medium for storing such information/instructions.

In an embodiment, the processor is arranged to input the determined terrain type to the data memory together with the corresponding sensor output data and/or the at least one calculated acoustic parameter to supplement the pre-determined data as part of a self-learning process. This would ensure that the system evolves to become more reliable in providing accurate indications of the terrain type.

The system may comprise a human machine interface arranged to enable communication of the determined terrain type to the user. The human machine interface may be configured to enable user-input in relation to the terrain type following determination of the terrain type by the user.

The processor may be arranged to update the data memory with the terrain type input by the user, the sensor output data, and/or the at least one calculated acoustic parameter so as to provide data for the pre-determined data sets. This improves the accuracy of the system in determining terrain type by increasing the quantity and quality of the pre-determined data sets.

The system may include a controller to control at least one vehicle subsystem in dependence on the determination of the terrain type. This may be done automatically, obviating the need for the driver to change the setup of the systems of the vehicle manually.

The processor may be arranged to receive acoustic sensor output data from the or each acoustic sensor in the form of an acoustic power signal representative of power in an acoustic signal reflected from the terrain in the vicinity of the vehicle. The received signal power is a useful measurable value which can be analysed in order to determine an indication of terrain type.

The system may include at least one acoustic transmitter for transmitting an acoustic signal to the terrain in the vicinity of the vehicle and at least one acoustic receiver for receiving a reflected signal of the acoustic signal from the terrain in the vicinity of the vehicle. These may be separate components or may be part of a single unit.

In some embodiments, the processor is arranged to divide the received sensor output data into at least two data sets, each set corresponding to acoustic signals reflected from a different section of the terrain in the vicinity of the vehicle. These independent data sets may be analysed separately by the processor and compared against one another in order to help determine an indication of the terrain type. Each section of the terrain may be of substantially equal length in a longitudinal direction with respect to the vehicle.

The processor may be arranged to compensate for signal path loss in the received sensor output data. Alternatively, or in addition, the processor may be arranged to gate in time the received sensor output data in order to filter out unwanted reflected signals. These techniques ensure that the received signals are indicative of the terrain type and that received signals from different sections may be compared accurately against one another.

The processor may be arranged to average over at least two measurements the received sensor output data corresponding to reflected signals from a particular section of the terrain in the vicinity of the vehicle. As the vehicle moves, a particular part of the terrain will be located in each of the sections. Therefore, two or more independent measurements of the reflected signal from this particular part of the terrain are received by the system, which are averaged to provide sensor output data that is more robust and reliable for determining the terrain type.

The processor may be arranged to receive an output from a roll sensor and/or a pitch sensor of the vehicle and to correct for noise in the received sensor output data based on the output from the roll sensor and/or the pitch sensor. This may be particularly important when travelling off-road over uneven terrain where the angle of the transmitted acoustic signal with respect to the ground is changing as the vehicle negotiates the terrain.

The at least one acoustic parameter may include one or more of the mean power of the received sensor output data, the standard deviation of the received sensor output data, the duration for which the power of the received sensor output data is above a threshold value, and the total power of the received sensor output data that is above a threshold value. It may be useful to analyse a range of acoustic parameters to better distinguish between different terrain types. Different combinations of acoustic parameters may be preferable for distinguishing between particular pairs of terrain types.

The threshold value mentioned above may be selected from one or more pre-determined constant values. Alternatively, or in addition, the processor may be arranged to calculate or select the threshold value based on the average amplitude of the received sensor output data. In some embodiments, the processor is arranged to calculate or select the threshold value based on the power of the acoustic signal transmitted by the transmitter. Another option is that the processor is arranged to calculate or select the threshold value based on the weather conditions in which the vehicle is travelling. This is because the particular weather conditions may affect the power of the signal received by the system.

In some embodiments the comparison of the at least one acoustic parameter with the pre-determined data includes the processor being arranged to execute a neural network algorithm. In such an embodiment, the neural network algorithm is arranged to receive the at least one calculated parameter, to provide a plurality of outputs corresponding to a plurality of different terrain types, and to associate the plurality of parameters with one of the plurality of outputs, so as to determine an indication of the terrain type. The neural network algorithm advantageously processes a relatively large number of acoustic parameters associated with the received acoustic sensor output data when determining the particular terrain type, and this allows a more accurate determination of the terrain type to be made.

In some embodiments, the processor being arranged to compare the at least one acoustic parameter with the pre-determined data includes the processor being arranged to execute a clustering classification algorithm, so as to determine an indication of the particular terrain type.

The or each acoustic sensor is mounted at the front of the vehicle so that the system may determine an indication of the type of terrain ahead of the vehicle. In many situations it will be the terrain ahead of the vehicle, i.e. the terrain over which the vehicle will travel, that is of interest to the driver of the vehicle. In this case, the acoustic sensors should be able to transmit signals ahead of the vehicle, i.e. be mounted at the front of the vehicle.

According to another aspect of the invention there is provided a method for use in a vehicle for determining an indication of the type of terrain in the vicinity of the vehicle. The method includes receiving acoustic sensor output data from at least one vehicle-mounted acoustic sensor, the or each acoustic sensor being arranged to receive a reflected signal from the terrain in the vicinity of the vehicle, and calculating at least one acoustic parameter in dependence on the acoustic sensor output data. The method also includes retrieving stored pre-determined data relating the at least one acoustic parameter to a particular terrain type, and comparing the at least one acoustic parameter with the pre-determined data to determine an indication of the particular terrain type corresponding to the acoustic sensor output data.

The processes of receiving the acoustic sensor output data, calculating the at least one acoustic parameter, retrieving the stored pre-determined data and comparing the at least one acoustic parameter with the pre-determined data may be performed in real time. The vehicle may then automatically change the vehicle setup in time to negotiate the identified terrain.

According to a further aspect of the invention there is provided a vehicle comprising any of the systems described above.

According to a still further aspect of the invention there is provided a computer program product comprising a non-transitory computer readable storage medium including computer readable program code, wherein the computer readable program code when executed causes a processor to implement the method described above.

According to the invention there may also be provided a controller loaded with the computer program product described above.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
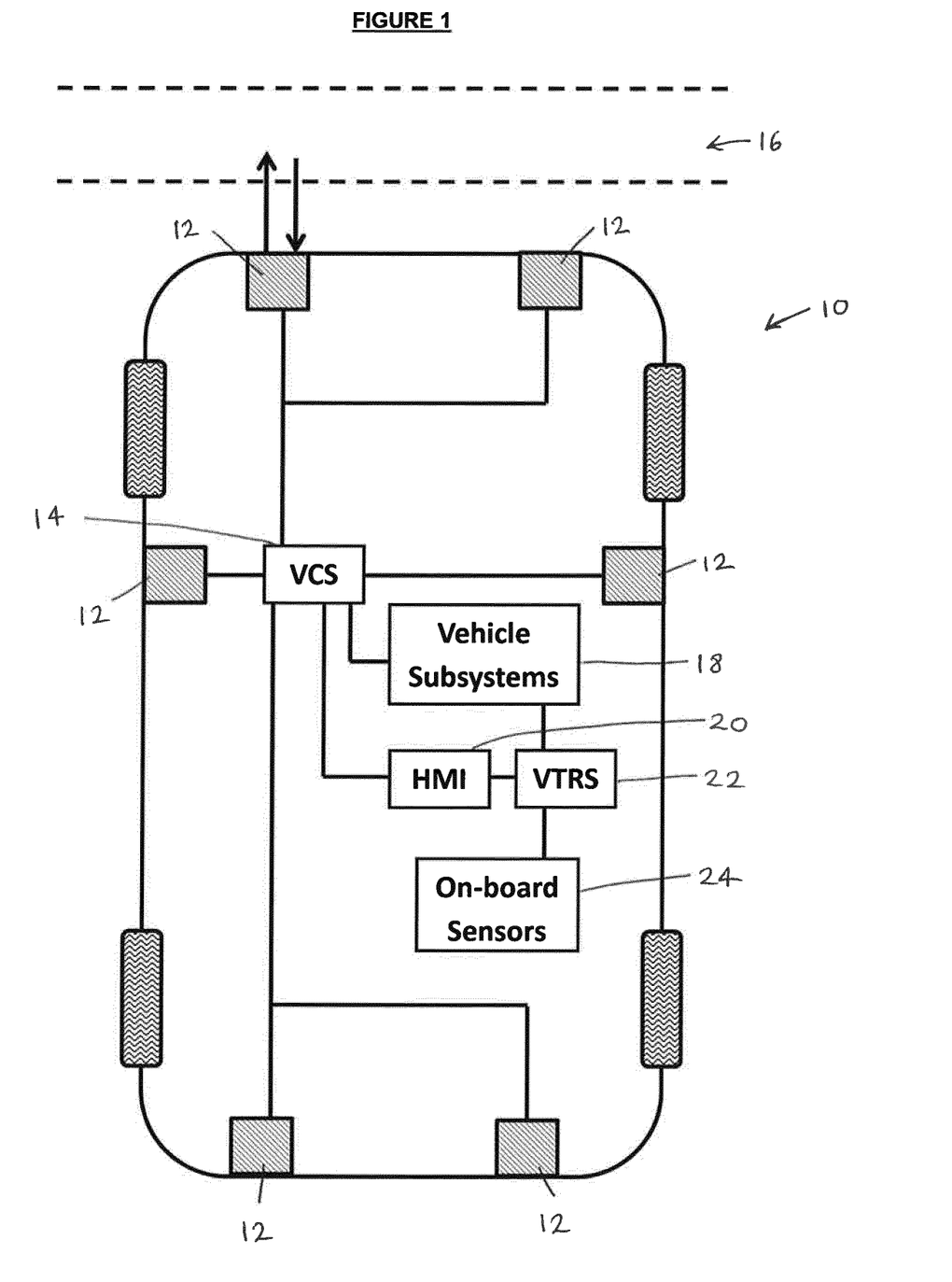
FIG. 1 shows a schematic illustration of a vehicle including a vehicle control system (VCS), and of terrain ahead of the vehicle.

With reference to FIG. 1, there is shown a vehicle 10 that includes front, rear and side mounted acoustic sensors 12 and a vehicle control system (VCS) 14. FIG. 1 also shows a section of terrain 16 ahead of the vehicle 10. In particular, the acoustic sensors 12 are sonar sensors, and are arranged to receive a reflected signal from the terrain 16 ahead of the vehicle 10. This is described in greater detail below.

The VCS 14 is arranged to receive acoustic sensor output data from the acoustic sensors 12 and to determine an indication of the particular terrain type based on the received acoustic sensor output data. The VCS 14 then sends control signals to one or more subsystems 18 (such as a suspension system, traction-control system, stability-control system, engine torque system, or ride height system) of the vehicle 10 so as to allow automatic adjustment of the setup of the vehicle 10 accordingly. The VCS 14 also communicates with a human machine interface (HMI) 20 which incorporates a display. Via the HMI display, the user receives alerts or advice, relating to a host of vehicle systems, for example, satellite navigation or in-vehicle entertainment systems. The HMI 20 may also alert the user as to the determination of a particular terrain type identified by the VCS 14. The HMI 20 includes a touch-screen keyboard, dial, or voice activation to enable user selection of a particular input for the various vehicle systems which can be controlled. In particular, the user may control manually the setup of various subsystems of the vehicle 10 in dependence on an alert from the VCS 14. The operation of the VCS 14, in order that it may determine the terrain type ahead of the vehicle 10 based on the acoustic sensor output data, is discussed in greater detail below.

The vehicle 10 also includes a VCS in the form of a vehicle terrain response system (VTRS) 22, such as a Terrain Response® system. The VTRS 22 receives sensor output data from one or more on-board sensors 24 (such as, but not limited to, a wheel speed sensor, tyre pressure sensor, vehicle speed sensor, brake pedal position sensor, a rainfall sensor, suspension articulation, acceleration, wheel slip, pitch rate, and yaw rate) indicative of the terrain over which the vehicle 10 is currently travelling. The determination of the VTRS 22 may provide a check as to the accuracy of the determination made by the VCS 14 when the vehicle 10 travels over the section of terrain 16 of interest. If the VTRS 22 makes a determination different to that of the VCS 14, the VTRS 22 may be configured to override the determination of the VCS 14 and to control the subsystems 18 and/or send an alert to the user based on the updated terrain identification as appropriate. The operation of the VTRS 22 in order that it may determine the terrain type over which the vehicle 10 is travelling based on the on-board sensor output data is described in granted UK patent GB2492655.

Figure 2:
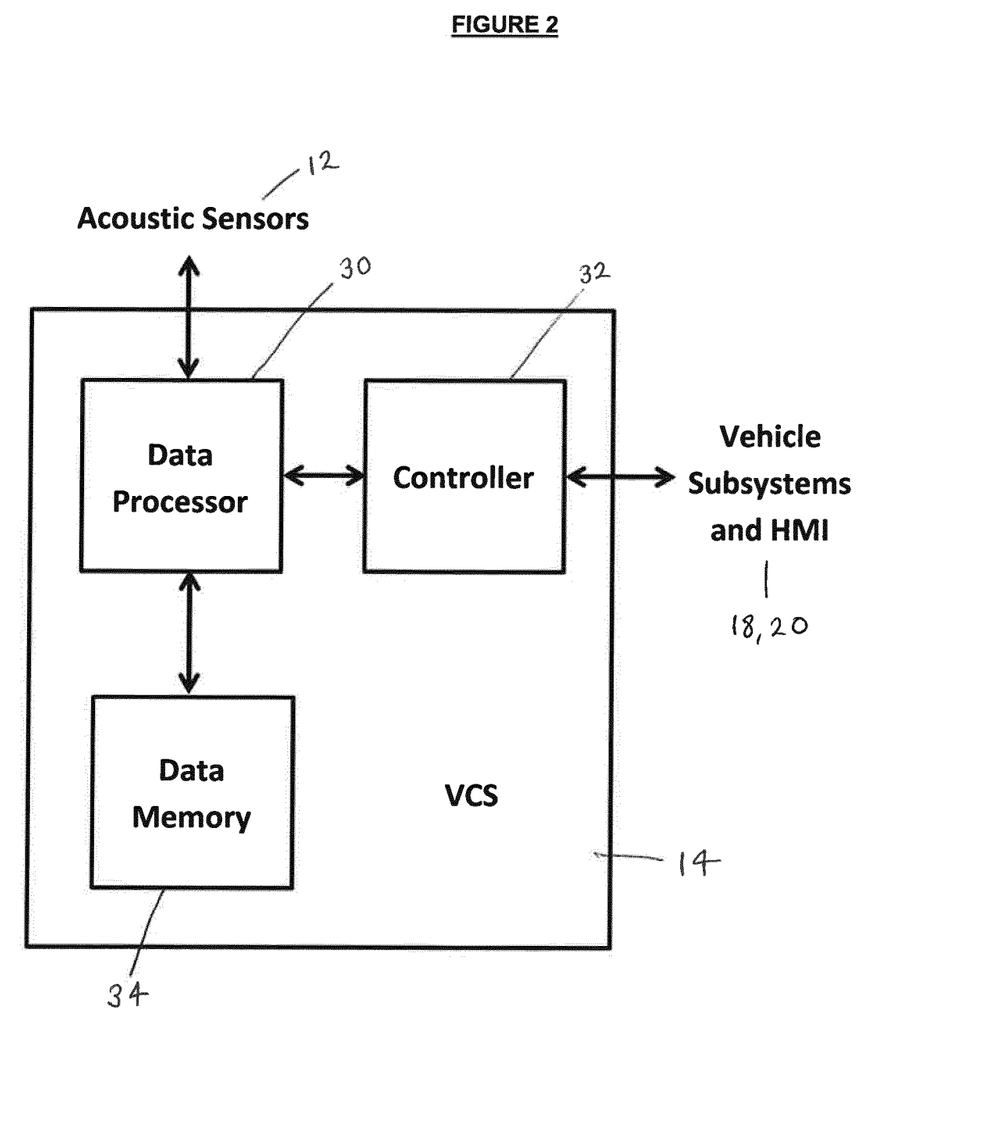
FIG. 2 is shows the component parts of the VCS shown in FIG. 1, together with the inputs to, and outputs from, the VCS.

FIG. 2 shows the VCS 14 in more detail. The VCS 14 includes: a data processor 30 that receives acoustic sensor output data from the acoustic sensors 12; a VCS controller 32 for sending signals to, and receiving signals from, the HMI 20 and vehicle subsystems 18; and a data memory 34 for storing acoustic sensor output data.

The VCS 14 determines an indication of the terrain type ahead of the vehicle 10 in real time using parameters calculated using the acoustic sensor output data that is collected (also in real time) by the acoustic sensors 12. By real time is meant of the order of seconds. The VCS controller 32 then sends a control signal to either the subsystems 18 to adjust the vehicle setup, or to the HMI 20 to enable communication to the user of the particular terrain ahead and to prompt the user to control the subsystems 18 on this basis. Here and throughout, the term "determine" should be interpreted to mean "makes a best estimation of".

In more detail, the data processor 30 of the VCS 14 receives acoustic sensor output data from the acoustic sensors 12. The data processor 30 is responsible for associating the received acoustic sensor output data to a particular terrain type which it does by retrieving pre-determined data from the data memory 34 for comparison with parameters calculated based on the acoustic sensor output data. This is described in greater detail later. Upon determination of the terrain, the data processor 30 communicates with the VCS controller 32, which is responsible for sending control signals as described above.

Figure 3:
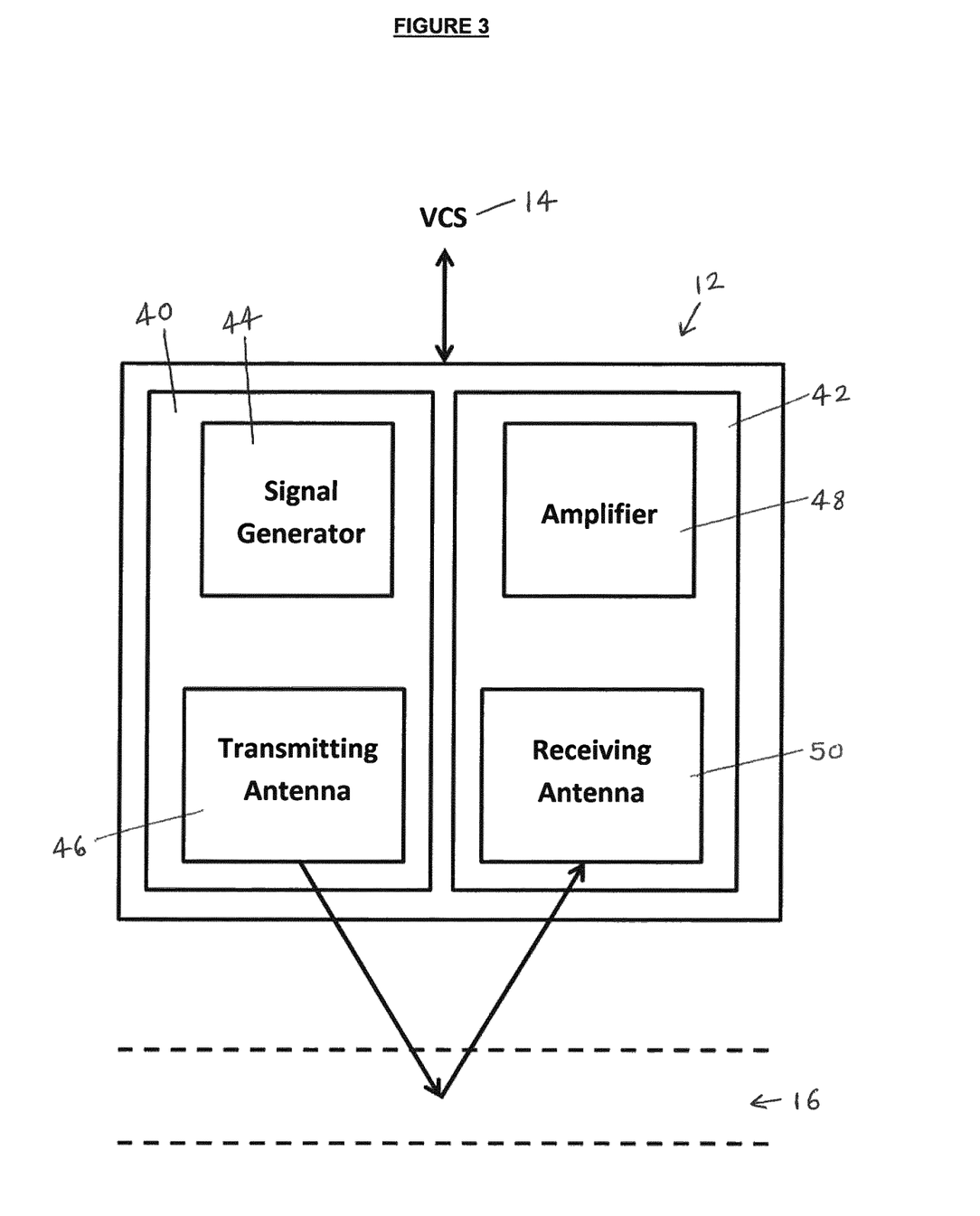
FIG. 3 shows the component parts of one of the acoustic sensors shown in FIG. 1, together with the inputs to, and outputs from, the sensor.

With reference to FIG. 3, the acoustic sensor 12 includes an acoustic transmitter 40 and an acoustic receiver 42. In particular, the acoustic transmitter 40 includes a signal generator 44 and a transmitting transducer 46, and the acoustic receiver 42 includes an amplifier 48 and a receiving transducer 50. The signal generator 44 is arranged to generate a pulsed or modulated acoustic signal which is to be transmitted by the transmitting transducer 46 towards the terrain 16 ahead of the vehicle 10. Upon incidence with the terrain 16, some of the signal will be reflected back towards the acoustic sensor 12 and received by the receiving transducer 50. The power of the received acoustic signal is to be amplified by the amplifier 48, and this acoustic sensor output data is to be sent to the VCS 14.

Figure 4:
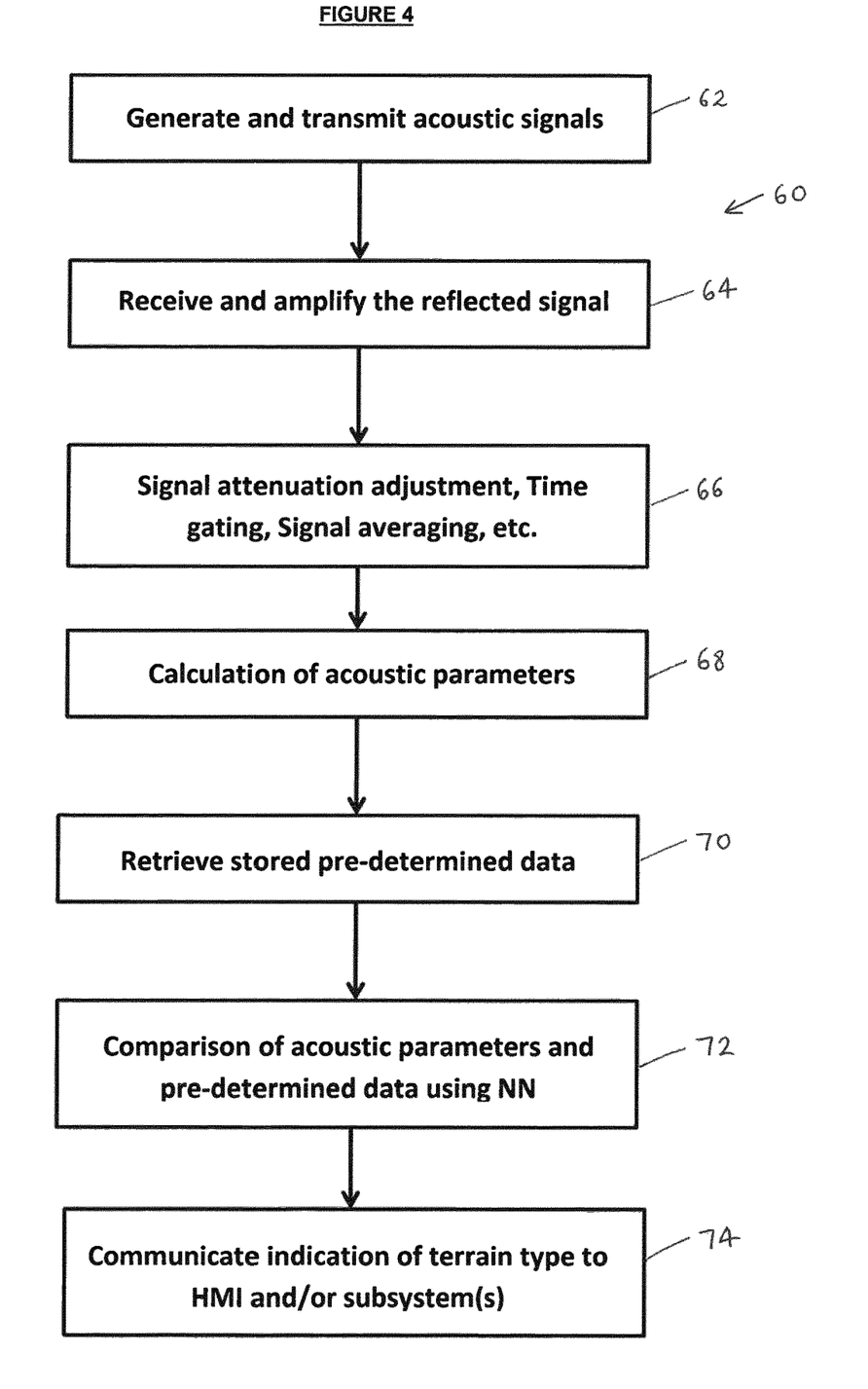
FIG. 4 is a flow diagram which illustrates a process undertaken by the VCS in FIG. 2 according to an embodiment of the invention for determining an indication of the particular type of terrain shown in FIG. 1.

FIG. 4 shows the steps of a method 60 undertaken by the VCS 14 in order to determine an indication of the particular type of terrain 16 in the vicinity of the vehicle 10. At step 62, and with additional reference to FIG. 5a, the signal generator 44 of the acoustic sensor 12 (which is mounted at the front of the vehicle 10 in the described embodiment) generates an acoustic signal 80 (specifically, a conical beam) which the transmitter 40 then transmits towards the surface 16 ahead of the vehicle 10. The frequency of the transmitted signal is about 40 kHz. More generally, the transmitted acoustic signal 80 may be between about 35 kHz and about 55 kHz. The receiver 42 is arranged to receive the reflected signal also at 40 kHz.

The greater the speed of the vehicle 10, the greater the Doppler shift on the reflected signal compared with the transmitted signal and so, particularly depending on the intended use for the system (i.e. off-road etc.), the receiver 42 may be arranged to receive the reflected signal at different frequencies, i.e. over a range of frequencies thereby to ensure that the frequency shifted reflected signal is detected by the receiving transducer 50.

The transmitted acoustic signal or beam 82 insonifies a section 82 of the terrain (or surface) 16, the signal 80 having a central grazing angle denoted $\theta_1$, that is, the angle of the centre 84 of the transmitted signal 80 makes with the terrain 16. In this embodiment $\theta_1$ is about 10°; however, more generally $\theta_1$ may be between about 8° to about 12°, or any other suitable value. The actual grazing angle of the signal 82 will be dependent upon the height at which the sensor 12 is mounted, which in turn will be dependent upon the geometry of the vehicle 10. The higher the sensor 12 is mounted the greater the grazing angle that will be used to ensure that a reflected signal is received from a suitable distance in front of the vehicle, e.g. up to six meters or up to ten metres in front of the vehicle.

The transmitted signal 80 is transmitted from a height H above the surface 16 i.e. the sensor 12 is mounted to the vehicle 10 at a height H above the surface 16. In this embodiment the height H is 0.65 m; however, the sensor 12 may be mounted to the vehicle 10 at any other suitable height. Therefore in the present embodiment the distance between the points marked A and B is 3.69 m (to two decimal places). The transducer half-width angle of the acoustic beam 80 transmitted by the sensor 12 is denoted $\theta_b$ such that the minimum distance between the vehicle 10 and the insonified surface 82 is the distance between A and C, and the beam incident at this point makes an angle $\theta_0$ with the surface 16. In the present embodiment, $\theta_b$ is about 25°; however, any other suitable beamwidth may be used. The transmitted beam 80 is not incident with the surface between the points A and C.

The transmitted acoustic signal 80 scatters upon incidence with, and deflection off, the terrain 16. The physical shape/texture/roughness of the terrain 16 changes certain characteristics of the transmitted acoustic signal 80. Some of the deflected acoustic signal is reflected back towards the acoustic sensor 12. At step 64 the reflected signal is received by the receiving transducer 42 and this received signal is amplified by the amplifier 48. FIG. 5b shows the power of the reflected acoustic signal received and amplified by the receiver 42 as a function of the distance from the vehicle 10. In particular, as seen in FIG. 5a the transmitted signal 80 is not incident on the terrain 16 located between the points A and C, and so the small amount of signal power in this range may be regarded as noise. The reflected signal from the point B on the terrain 16 has the maximum reflected power, and this decreases to a reflected signal of zero or negligible power (i.e. no reflected signal) at the point A on the surface 16. This is because, as expected, the received power of the reflected signal decreases with an increase in the distance it must travel both from the transmitter 40 to the surface 16, and then from the surface 16 to the receiver 42. For instance, the power of the received signal decays with distance more slowly for 'rougher' surfaces.

Returning to FIG. 5a, there is shown a shaded area 86 of a section or strip of the insonified surface 82. In the present embodiment, the insonified surface 82 is divided into three such strips of substantially equal length in a longitudinal direction ahead of the vehicle. These strips may be referred to as swathes. Specifically, the processor 30 divides the received sensor output data into three sets, each one corresponding to a respective one of the swathes of the insonified surface 82. For instance, the length of the shaded strip 86 is the distance between the points marked D and E in FIG. 5a.

Figure 5:
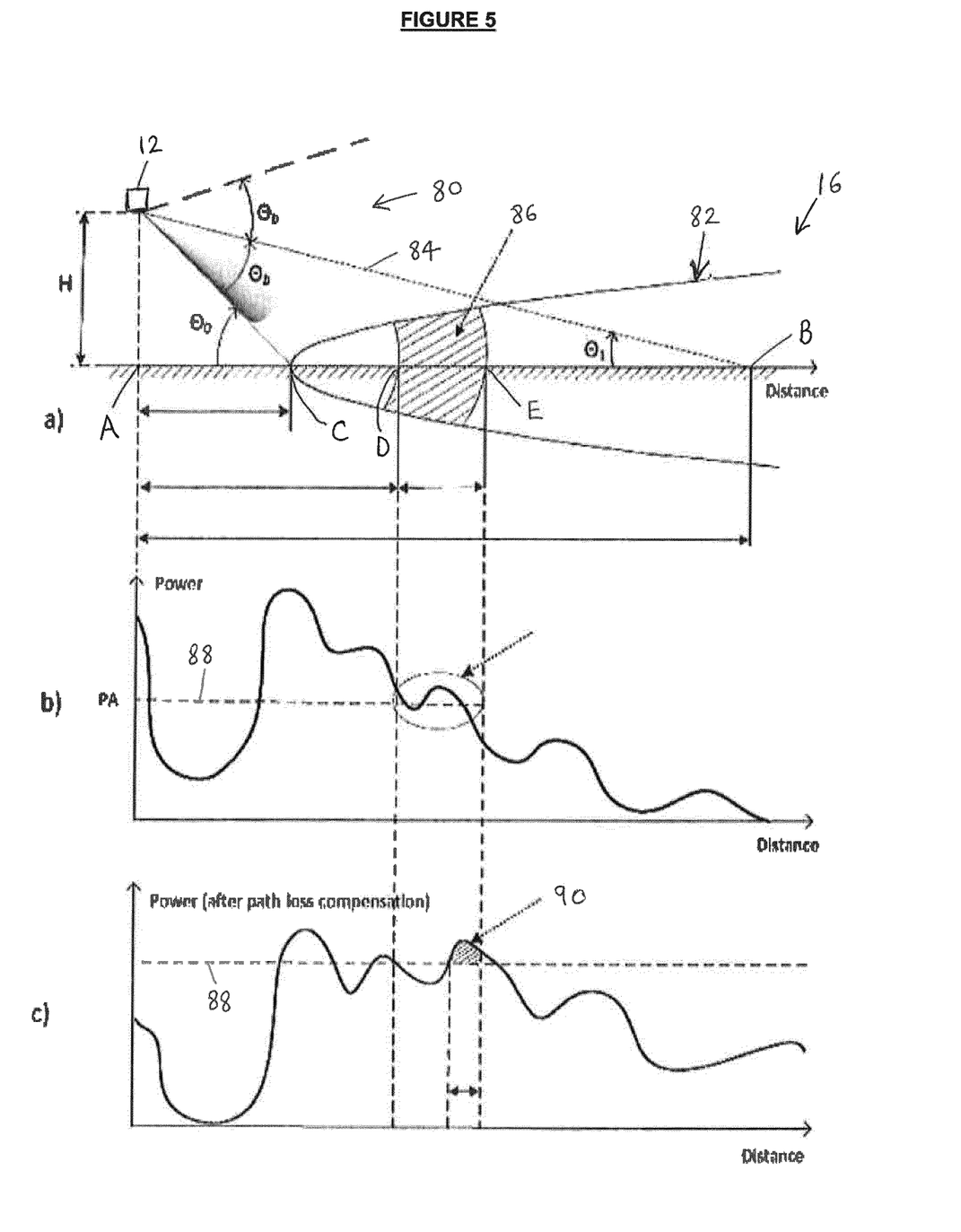
FIG. 5a shows a section of the terrain of FIG. 1 from which the acoustic sensor of FIG. 3 receives a reflected signal, together with the angle of incidence of the acoustic signal.
FIG. 5b shows how the power of the received acoustic signal reflected from the section of terrain in FIG. 5a varies with distance from the acoustic sensor.
FIG. 5c shows how the power of the received acoustic signal varies with distance after the power has been adjusted to account for path loss.

In this case the distance between D and E is 1 m. The insonified surface 82 may, however, be divided into any number of strips of any suitable length. This choice may be made depending on the particular type of acoustic sensor being used and/or the conditions (e.g. weather conditions) in which the system is being used. For each strip, the data will comprise a plurality of discreet data points, for example approximately 33 data points at a resolution of 3 cm, which data points form the curve shown in FIG. 5.

The reflected signals received (and amplified) by the sensor 12 are input as sensor output data to the processor 30 of the VCS 14. The processor 30 determines to which swathe each part of the sensor output data corresponds. This is readily done by taking into account the difference in time between the signal being transmitted and then received back by the sensor 12, and also the speed at which the vehicle 10 is travelling. The characteristics of the sensor output data corresponding to a particular swathe of the insonified surface 82 may then be compared against those characteristics of the sensor output data corresponding to other swathes, and also against the pre-determined data stored in the data memory 34, as is described below. It is possible that adjacent swathes may overlap each other. This means that individual data points received from a particular part of the insonified surface 82 may simultaneously be part of the data set for more than one swathe.

In order that the sensor output data corresponding to each swathe may be compared, the power of the received signal (shown in FIG. 5c) undergoes path loss compensation to eliminate the differences in the received power from different parts of the surface 16 that are caused by, amongst other things, the differences in the distance that each part of the signal travels from the transmitter 40 to the surface 16 and then to the receiver 42. In other words, the power of the received signal is adjusted by the processor 30 to account for signal attenuation, and this is carried out at step 66 of the method 60 shown in FIG. 4. The path loss compensated power of the received signal against the distance from the transmitter 40 is shown in FIG. 5c. It is seen that the path loss compensated power (shown in FIG. 5c) of the signal reflected from the part of the insonified surface 82 closest to the vehicle 10 (i.e. close to point C) is lower than the actual power of the reflected acoustic signal (shown in FIG. 5b) received by the receiver 42. Conversely, the path loss compensated power of the signal reflected from the part of the insonified surface 82 farthest from the vehicle 10 (i.e. close to or beyond point B) is greater than the actual power of the reflected acoustic signal received by the receiver 42. Path loss compensation can be done in a known manner, for example a gain of $R^3$ or $R^4$, where R is the range (i.e. the distance from the sensor 12 to the surface from which it is reflected) can be applied to each reflected data point recorded. The gain may be altered depending upon prevailing weather conditions. For example in rain, snow or fog a multiplier may be applied to the gain to take into consideration the greater attenuation of signals in such conditions.

Also at step 66, the processor 30 uses time gating in order to filter out unwanted signals received by the receiver 42, the unwanted signals being reflected from, for example, air fluctuations, obstacles around the vehicle and sidelobes. In the present embodiment, the processor 30 is arranged to set the time gate to receive signals reflected in the range of about 1.5 m to about 4 m; however, any other suitable range may be chosen. To maintain the specified range, the time gate should be adjusted depending on the speed at which the vehicle 10 is travelling. The processor 30 receives vehicle speed data, either continuously or at intervals, from a vehicle speed sensor (part of the vehicle subsystems 18). This speed data may be used together with the distance that the signals must travel to and from the surface 82 (i.e the grazing angle) to determine at which times the reflected signal should be gated in order to obtain swathes of the desired length in the longitudinal direction.

Also at step 66, the processor 30 averages over at least two measurements the sensor output data corresponding to reflected signals from a particular section of terrain that is received by the receiver 42. As described above, the insonified surface 82 of the present embodiment is divided into three swathes. As the vehicle 10 travels forward, a particular part of the terrain 16 ahead of the vehicle 10 will be located in each of the swathes. Specifically, if the vehicle 10 is moving forwards then the particular part of the terrain 16 will first be located in the swathe farthest from the vehicle 10, followed by the 'middle' swathe, before finally being located in the swathe nearest to the vehicle 10. Therefore in this case three independent measurements of the reflected signal from a particular part of the terrain 16 are received by the receiver 42. The processor 30 averages the received sensor output data corresponding to a particular part of the terrain 16 so that the parameter values calculated from the sensor output data that are to be used to determine the terrain type (see below) are more robust and reliable.

At step 68 of the method of FIG. 4, the processor 30 extracts features of the sensor output data corresponding to each swathe. Expressed differently, the processor 30 calculates one or more so-called acoustic parameters from the sensor output data for each swathe. Some of the acoustic parameters are calculated using the sensor output data corresponding to the actual power of the received signal (i.e. before adjusting for signal attenuation). These acoustic parameters include the mean signal power (across each swathe) and the signal standard deviation (across each swathe). Other acoustic parameters are calculated using the sensor output data after adjustment for signal attenuation has been performed. These acoustic parameters include the signal duration above a threshold value (for each swathe) and the signal power above the threshold value (for each swathe).

The received signals from the swathes closest to the sensor 12 have less distance to travel than those further away from the sensor 12. The signals received from a swathe closer to the sensor 12 will therefore in general be stronger than signals from more distant swathes, and so will need less amplification. This reduced level of required amplification means that any errors in the signals will be amplified to a lesser degree, and so the signals from closer swathes may be more reliable/may give a better indication of the particular terrain type than signals from swathes located further from the vehicle 10. Therefore, as the vehicle 10 moves forward the swathe is analysed multiple times as it approaches the vehicle 10, and the confidence in the determined terrain type is therefore increased on each subsequent swathe analysis of the same piece of terrain 16.

The threshold value of power is shown via a dotted line 88 in FIGS. 5b and 5c. The constant threshold value 88 in the described embodiment is based on the average amplitude of the received signal. The area of the shaded region 90 in FIG. 5c is calculated by the processor 30, and gives a measure of the signal power above the threshold value 88. The amount of time that this path loss compensated signal power is above the threshold value 88 is also calculated by the processor 30. Alternatively the threshold 88 could be a constant value for each swathe. In a further embodiment the threshold value could be an adaptive threshold value, i.e. the value varies depending on the nature of the received signal. The threshold for each swathe could be based on the average of the data points for the swathe in question and the swathes on either side thereof. A function may then be applied to the average to obtain the threshold value for that swathe, for example the function may be a percentage of the average, e.g. in the range of 75% to 125%. Each swathe will therefore have its own threshold value that varies over time.

Hence in the described embodiment, the processor 30 calculates twelve parameters, four for each of the three swathes, which are to be used to determine an indication of the terrain type ahead of the vehicle 10.

The processor 30 determines the particular terrain type based on the sensor output data from the acoustic sensor 12 only, and this is done using a neural network (NN) algorithm. For example, the NN algorithm may be a Multi-Layer Perceptron (MLP) NN model. Alternatively, any other suitable artificial NN model may be used. The MLP model comprises multiple layers of nodes (or perceptrons) in a multidimensional matrix, with each layer connected to nodes in the next layer. A weighting factor (or simply a 'weight') is applied to each node in order to maximise the probability of correct terrain classification by the NN algorithm, as is discussed below.

The inputs to the NN algorithm are the acoustic parameter values (also referred to as a parameter set) mentioned above, calculated using the sensor output data from the acoustic sensors 12. The outputs from the NN algorithm are the possible terrain types in the vicinity of the vehicle 10. When executed, the NN algorithm determines a value relating to the probability of correct classification for each of the outputs (i.e. terrain types) in dependence on a given set of input parameter values. In other words, the NN algorithm maps sets of input acoustic parameters (that are based on collected sensor output data) onto a set of appropriate outputs, where each output represents a different terrain type. The output with the highest value relating to the probability of correct classification represents the determined indication of terrain type ahead of the vehicle 10.

The MLP model uses a supervised learning technique referred to as 'back projection' for calibrating or training the network. At the point of vehicle manufacture, the VCS 14 undergoes a calibration phase or training phase. In particular, the weights applied to each node of the NN algorithm are unknown a priori. The purpose of the calibration phase is to determine the values of the weights that should be applied to each node. Therefore, at the calibration phase pre-determined sets of sensor output data in which the inputs and the outputs of the NN algorithm are known are used. Expressed differently, pre-determined sensor output data (that is, sensor output data relating to a known terrain type) obtained from offline measurements is used to calibrate the NN algorithm (i.e. to determine the values of the weights at each node of the NN algorithm). The pre-determined sensor output data may be part of a standardised data set and/or may include empirically-gathered data.

The pre-determined sensor output data is used to calculate values of all of the acoustic parameters of interest, i.e. in this case the twelve acoustic parameters mentioned above. Each determined parameter value is a separate input to the NN algorithm. At the start of the calibration phase, each weight in the NN algorithm may have a default value stored in memory 34. These default values are adjusted so that the calculated parameter values that are input to the NN algorithm are mapped through the nodes of each layer of the NN algorithm such that the output corresponds to the 'correct' terrain type (i.e. to the terrain type with which the pre-determined sensor output data is associated). There may be any number of possible outputs depending on the number of possible terrain types. For example, there may be four possible outputs (i.e. terrain types) from the NN algorithm, e.g. grass, gravel, snow, asphalt. The values of the adjusted weights used by the NN algorithm are stored in memory 34, where the values of the adjusted weights are such that the inputs relating to the pre-determined sensor output data are mapped to the correct output. These stored weight values are then the starting values used by the NN algorithm when executing the NN algorithm for the next set of pre-determined sensor output data.

This calibration process is repeated for several different sets of pre-determined sensor output data until the system has been calibrated i.e. until the stored weight values have been adjusted to an extent where the NN algorithm may make a determination of a particular terrain type with an acceptable level of accuracy. In other words, the calibration phase is for identifying the optimum pathways (generally referred to as the 'hidden layer' in neural networks) from the sensor output data through the weighted nodes in the NN algorithm for each terrain type. For example, at least 100 sets of pre-determined sensor output data relating to each terrain type may be used during the calibration phase.

The calibration phase may take place using hardware on the vehicle 10, but more likely the VCS 14 will be incorporated onto the vehicle 10 after the NN algorithm has been calibrated so that the calibration phase is carried out externally to the vehicle 10.

When the vehicle 10 is in use, the VCS 14 operates in an operational phase. In particular, during the operational phase the weights applied to each node of the NN algorithm are known a priori from the calibration phase (i.e. the final stored adjusted weight values), but the terrain type associated with a given set of sensor output data that is collected in real time is unknown. The purpose of the operational phase is to determine the terrain type associated with each set of sensor output data that is collected in real time using the acoustic sensors 12 on the vehicle 10.

At step 70 of the method of FIG. 4, the processor 30 retrieves stored pre-determined data for relating the acoustic parameters calculated at step 68 (corresponding to sensor output data from a particular part of terrain) to a particular terrain type from the data memory 34. The processor 30 also retrieves the stored weight values (calculated during the calibration phase) from the data memory 34, and these are used by the processor 30 to execute the NN algorithm. Alternatively, the weight values determined during the calibration phase may simply be coded into the NN algorithm in order to calibrate the NN algorithm for use in the operational phase.

At step 72, the calculated acoustic parameters are compared with the pre-determined acoustic parameters from the calibration phase in order to determine an indication of the terrain type. In particular, the NN algorithm maps the input acoustic parameters onto a set of appropriate outputs each representing a different terrain type. The output with the highest value relating to the probability of correct classification represents the determined indication of terrain type in the vicinity of the vehicle 10.

At step 74, the data processor 40 compares the terrain type determined by the NN algorithm to the terrain type for which the vehicle 10 is currently set up to travel over. If the determined terrain type is the same as the current terrain type then the system simply loops back to the start of the operational phase to analyse the next set of real-time sensor output data from the acoustic 12. If the determined terrain type is different to the current terrain type then the data processor 30 communicates with the controller 32 to send a control signal to the vehicle subsystems 18 and/or the HMI 20. The system then loops back to the start of the operational phase to analyse the next set of real-time sensor output data from the acoustic sensors 12.

Further details of the neural network process to determine terrain type is given in our co-pending UK Application No. GB1501754.4. Other suitable algorithms, including K-means and K nearest neighbour algorithms may alternatively be used and will be familiar to a person versed in the art.

The processor 30 may also be arranged to receive an indication of the terrain type in the vicinity of the vehicle 10 as determined by the driver. If the terrain type as determined by the driver matches the determination using the sensor output data, then the sensor output data and/or the corresponding calculated parameters may be stored in the data memory 34 together with the particular terrain type so as to supplement the pre-determined data as part of a self-learning process. This stored data may then be used to improve the accuracy of the system in subsequent determinations of terrain type based on sensor output data.

The vehicle 10 of the above-described embodiment includes a plurality of acoustic sensors 12; however, the vehicle 10 may instead include only a single acoustic sensor. The one or more acoustic sensors may be mounted at any position on the vehicle. In the above-described embodiment, a vehicle-mounted acoustic sensor receives a signal reflected from terrain ahead of the vehicle 10; however, the one or more acoustic sensors 12 may be arranged to receive a signal reflected from terrain anywhere in the vicinity of the vehicle 10.

One or more of the acoustic sensors 12 may be used to collect data which is to be input to a parking assistance system of the vehicle 10. Acoustic sensors used for parking assistance systems are typically able to detect obstacles at short-range (about 0.25 m to about 1.5 m) but at a wide angle from the direction in which the sensor is pointed. The transmitted signals are typically transmitted substantially parallel to the ground over which the vehicle is travelling. One or more of the acoustic sensors used to provide sensor output data to a parking assistance system may instead or additionally be used to provide sensor output data to the VCS 14 because of their similar structure and principles of operation. In particular, the acoustic sensor may be adapted depending on whether it is to be utilized for terrain classification or for parking assistance. Such adaption may be required in order to reduce the error in the measurements received for either purpose. The acoustic sensor 12 may be adapted by changing its physical orientation with respect to the vehicle 10 in order to switch between the terrain identification mode and the proximity detection mode. This would change the orientation of the transmitted signal with respect to the vehicle 10, e.g. the transmitted signal may be substantially parallel to the terrain 16 in the proximity detection mode and directed towards the terrain 16 in the terrain identification mode. Alternatively, the acoustic sensor 12 may be adapted by changing the transmitted signal itself, that is, by altering the beam by electronic means (rather than by mechanical means). This may involve delaying one part of the transmitted signal with respect to another part in order to create a phase difference, thereby angling the signal 56 as appropriate for the proximity detection or terrain identification mode. The acoustic transmitter 40 and acoustic receiver 42 of the acoustic sensor 12 are shown as a single unit in the above embodiment; however, they may also be two separate units.

The swathes of the insonified surface 82 are of substantially equal length in the longitudinal direction in the above-described embodiment; however, individual swathes may be of different lengths and/or the lengths may vary depending on factors such as, for example, weather conditions, speed of the vehicle, the equipment being used etc.

The threshold value 88 in the above-described embodiment may be set differently to above. The threshold value may be adaptive and/or determined based on, for example, the power of the transmitted signal, the weather conditions etc.

In the above-described embodiment, four parameters for each swathe were used to determine an indication of the terrain type. The number of analysed parameters may be increased or decreased depending on the needs of the particular situation. Increasing the number of analysed parameters may increase the accuracy of the terrain identification. Other parameters that may be analysed include the average power in the near range (e.g. about 1.5 m to about 2.5 m from the vehicle 10) of the insonified surface 82 or in the far range (e.g. about 3 m to about 4 m from the vehicle 10).

In the above-described embodiment the processor 30 processes the sensor output data at step 66 of FIG. 4. Other signal processing may also be used to further reduce noise. For example, when the vehicle 10 is moving the pitch and/or roll of the vehicle may introduce a significant amount of noise to the received signal. In this case, the processor 30 may therefore be arranged to receive an input from a roll sensor and/or a pitch sensor of the vehicle 10 so as to eliminate or reduce these effects from the calculated parameters that are used to determine the terrain type.

The above-described embodiment uses a neural network algorithm to classify to which particular terrain type a given set of sensor output data corresponds. There are, however, many other classification algorithms that may be used. For example, a clustering classification algorithm such as a minimum distance classifier (MDC), k-nearest neighbours (KNN) or maximum likelihood estimator (MLE) may be used. The use of such clustering algorithms to determine terrain type is described in our co-pending UK Application GB1402397.2.

It will be appreciated that, although the processor 30 and controller 32 are shown as independent components, they may comprise a single electronic controller.

The invention claimed is:

1. A system for use in a vehicle for determining an indication of the type of terrain in the vicinity of the vehicle, the system comprising;
   a processor arranged to receive acoustic sensor output data from at least one vehicle-mounted acoustic sensor, the or each acoustic sensor being arranged to receive a reflected signal from the terrain in the vicinity of the vehicle, and
   a data memory arranged to store pre-determined data relating at least one acoustic parameter to a particular terrain type;
   wherein the processor is arranged to divide the received acoustic sensor output data into at least two data sets, each set corresponding to acoustic signals reflected from a different section of the terrain in a longitudinal direction ahead of the vehicle, and calculate at least one acoustic parameter for each data set in dependence on the received acoustic sensor output data of that set, and wherein the processor is arranged to compare the acoustic parameters with the pre-determined data to determine an indication of the particular terrain type based on the acoustic sensor output data only.

2. A system according to claim 1, wherein:
the processor is an electronic processor having an electrical input for receiving the acoustic sensor output data; and
the data memory is an electronic memory device electrically coupled to the electronic processor and having instructions stored therein,
the processor being configured to access the memory device and execute the instructions stored therein such that it is operable to calculate the acoustic parameters, and to compare the acoustic parameters with the pre-determined data to determine an indication of the particular terrain type based on the acoustic sensor output data only.

3. A system according to claim 1, wherein the processor is arranged to input the determined terrain type to the data memory together with the corresponding sensor output data and/or the acoustic parameters to supplement the pre-determined data as part of a self-learning process.

4. A system according to claim 2, comprising a human machine interface arranged to enable communication of the determined terrain type to the user.

5. A system according to claim 4, wherein the human machine interface is arranged to enable user-input in relation to the terrain type, to the processor, following determination of the terrain type by the user.

6. A system according to claim 5, wherein the processor is arranged to input the determined terrain type to the data memory together with the corresponding sensor output data and/or the acoustic parameters to supplement the pre-determined data as part of a self-learning process, and wherein the processor is arranged to update the data memory with the terrain type input by the user, the sensor output data, and/or the acoustic parameters.

7. A system according to claim 1, comprising a controller to control at least one vehicle subsystem in dependence on the determination of the terrain type.

8. A system according to claim 1, wherein the processor is arranged to receive acoustic sensor output data from the or each acoustic sensor in the form of an acoustic power signal representative of power in an acoustic signal reflected from the terrain in the vicinity of the vehicle.

9. A system according to any previous claim, comprising at least one acoustic transmitter for transmitting an acoustic signal to the terrain in the vicinity of the vehicle and at least one acoustic receiver for receiving a reflected signal of the acoustic signal from the terrain in the vicinity of the vehicle.

10. A system according to claim 1, wherein each section of the terrain is of substantially equal length in a longitudinal direction with respect to the vehicle.

11. A system according to claim 1, wherein the processor is arranged to at least one of;
compensate for signal path loss in the received sensor output data;
gate in time the received sensor output data in order to filter out unwanted reflected signals; and
average over at least two measurements the received sensor output data corresponding to reflected signals from a particular section of the terrain in the vicinity of the vehicle.

12. A system according to claim 1, wherein the processor is arranged to receive an output from a roll sensor and/or a pitch sensor of the vehicle and to correct for noise in the received sensor output data based on the output from the roll sensor and/or the pitch sensor.

13. A system according to claim 1, wherein the at least one parameter includes at least one of;
the mean power of the received sensor output data;
the standard deviation of the received sensor output data;
the duration for which the power of the received sensor output data is above a threshold value; and
the total power of the received sensor output data that is above a threshold value.

14. A system according to claim 13, wherein the threshold value is selected from one or more pre-determined constant values.

15. A system according to claim 13, wherein the processor is arranged to calculate or select the threshold value based on at least one of the average amplitude of the received sensor output data, the power of the acoustic signal transmitted by the transmitter, and the weather conditions in which the vehicle is travelling.

16. A system according to claim 1, wherein the processor being arranged to compare the acoustic parameters with the pre-determined data includes the processor being arranged to execute a neural network algorithm, the neural network algorithm being arranged to receive the acoustic parameters, to provide a plurality of outputs corresponding to a plurality of different terrain types, and to associate the plurality of parameters with one of the plurality of outputs, so as to determine an indication of the terrain type.

17. A system according to claim 1, wherein the processor being arranged to compare the acoustic parameters with the pre-determined data includes the processor being arranged to execute a clustering classification algorithm, so as to determine an indication of the particular terrain type.

18. A method for use in a vehicle for determining an indication of the type of terrain in the vicinity of the vehicle, the method comprising;
receiving acoustic sensor output data from at least one vehicle-mounted acoustic sensor, the or each acoustic sensor being arranged to receive a reflected signal from the terrain in the vicinity of the vehicle;
dividing the received acoustic sensor output data into at least two data sets, each set corresponding to acoustic signals reflected from a different section of the terrain in a longitudinal direction ahead of the vehicle,
calculating at least one acoustic parameter for each data set in dependence on the acoustic sensor output data of that data set;
retrieving stored pre-determined data relating the acoustic parameters to a particular terrain type; and
comparing the acoustic parameters with the pre-determined data to determine an indication of the particular terrain type corresponding to the acoustic sensor output data.

19. A vehicle comprising a system according to claim 1.

20. A computer program product comprising a non-transitory computer readable storage medium including computer readable program code, wherein the computer readable program code when executed causes a processor to implement the method of claim 18.

* * * * *